Patented Sept. 17, 1935

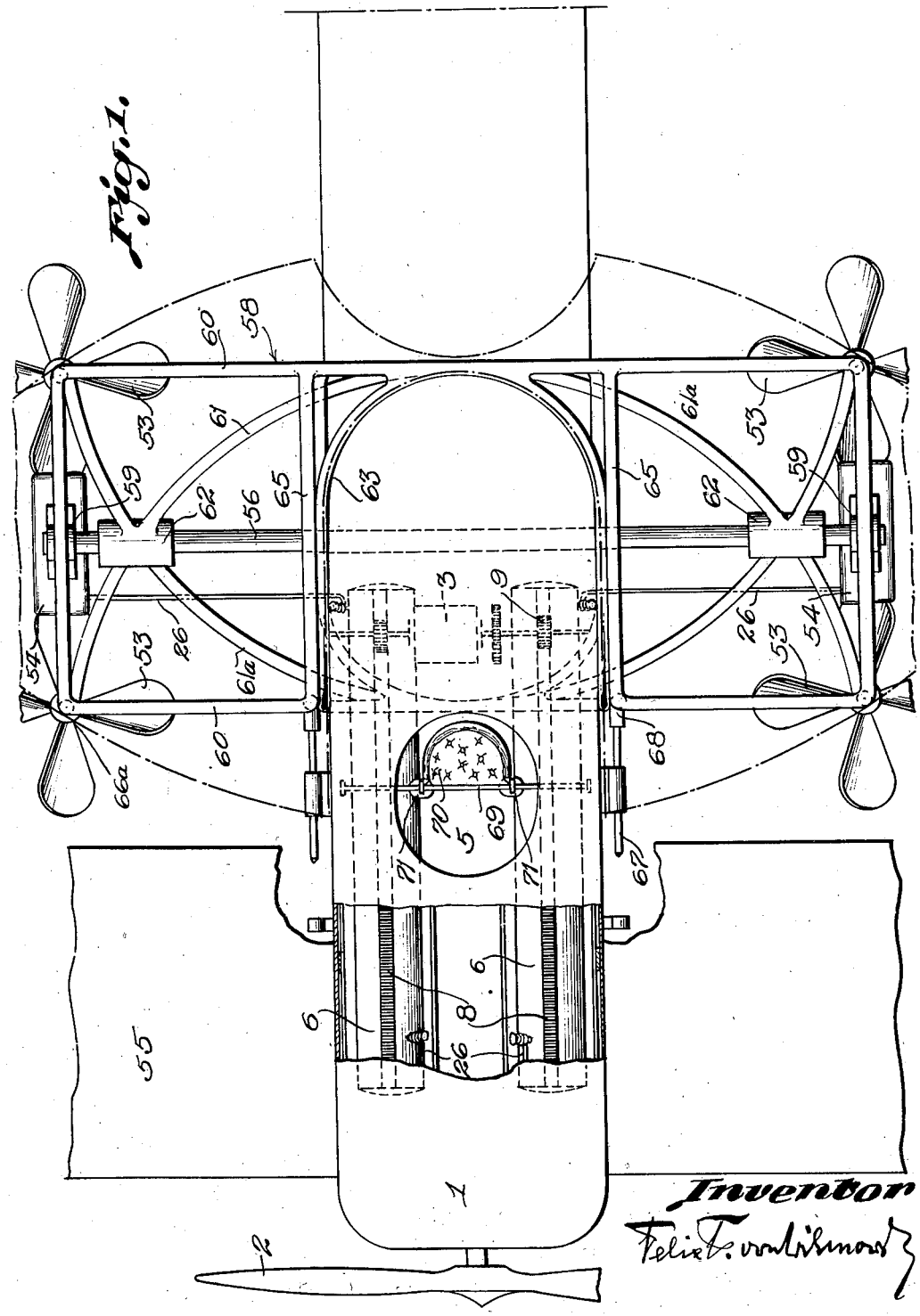

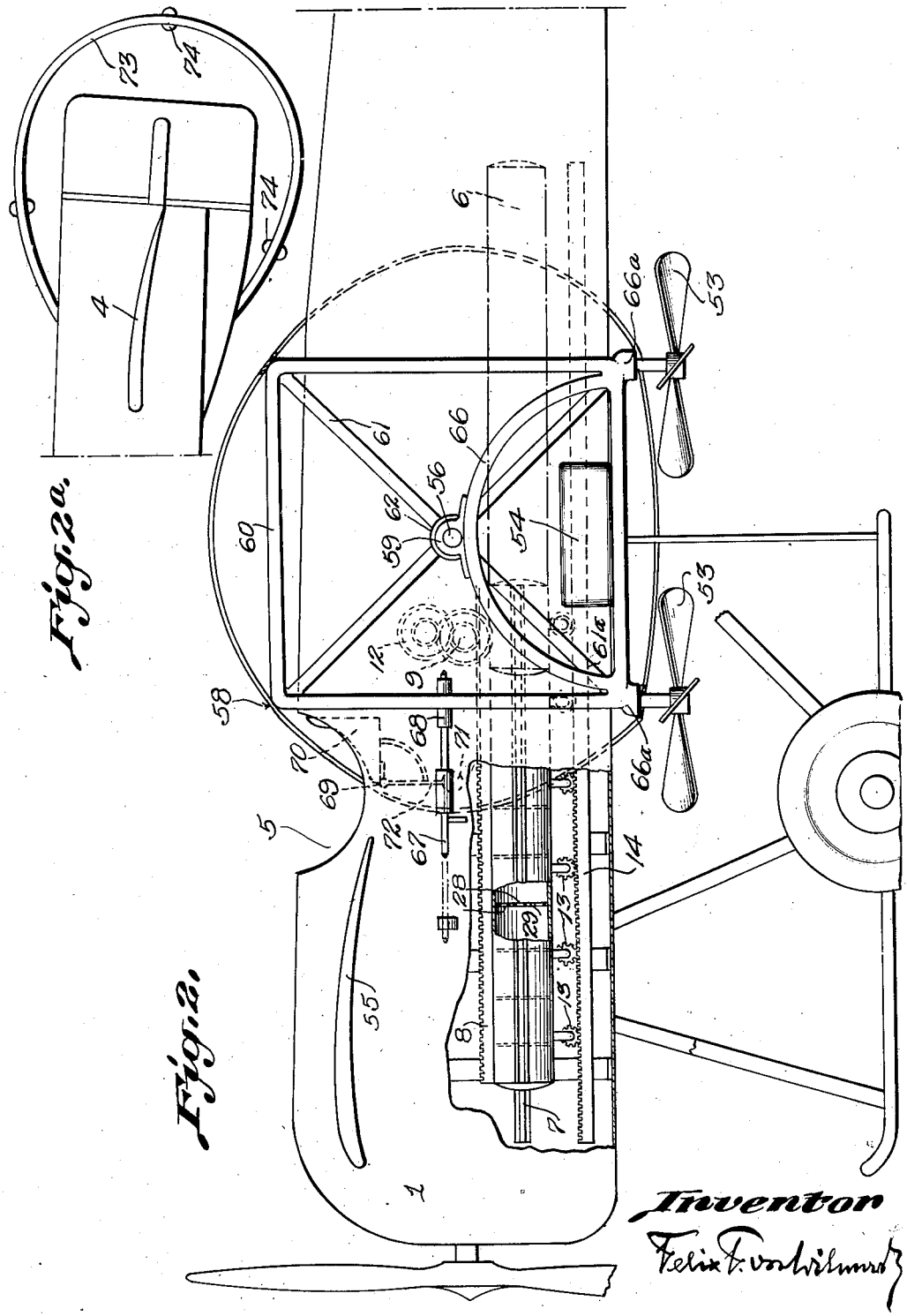

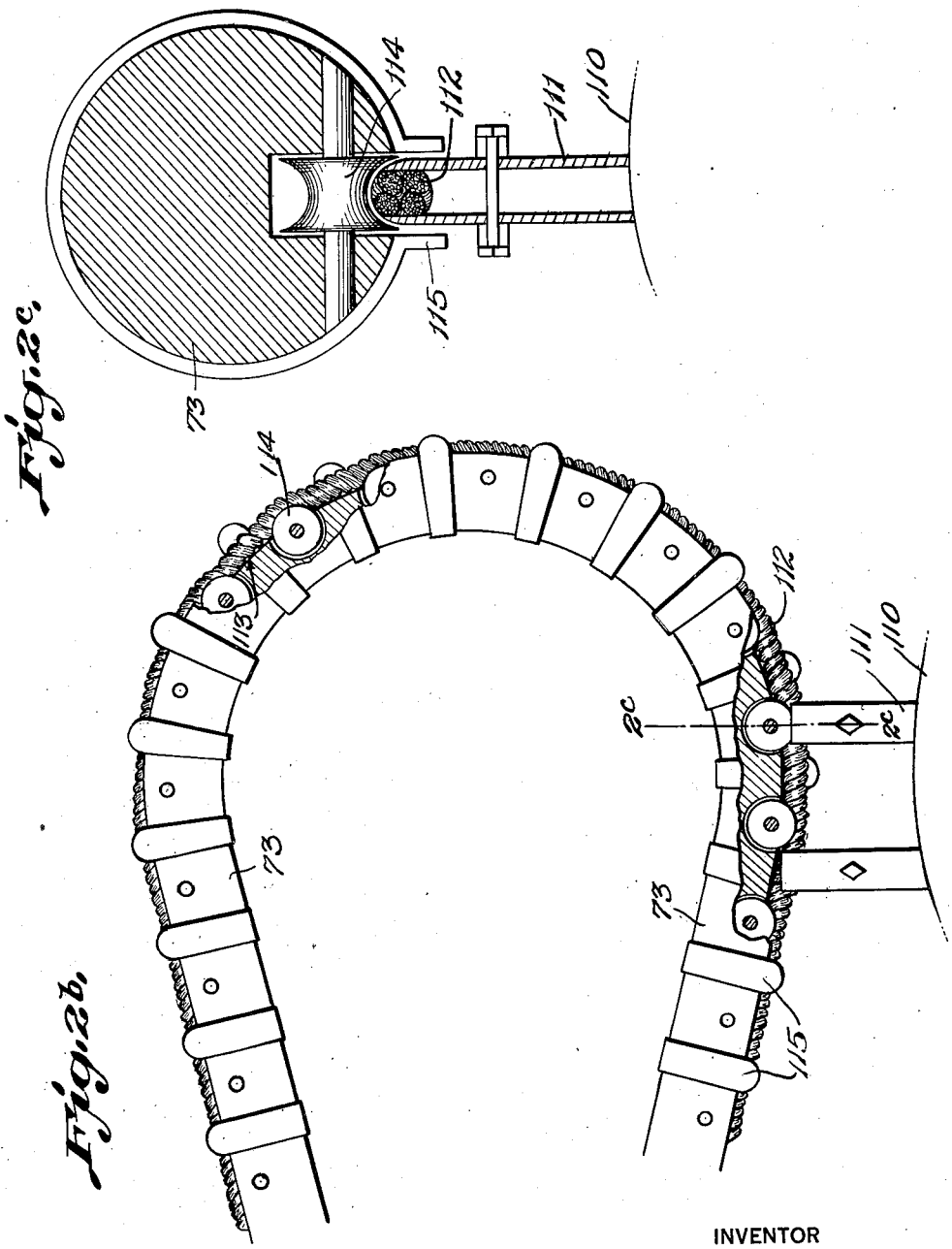

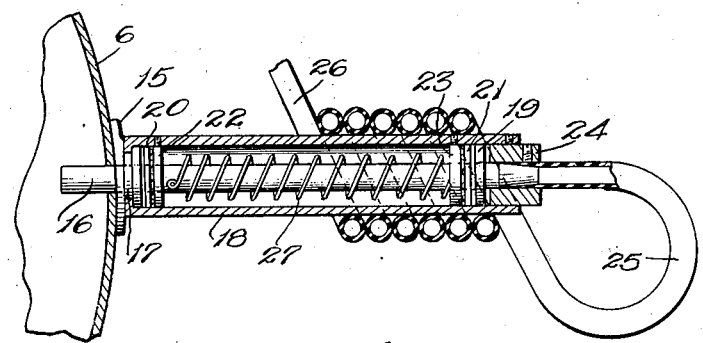
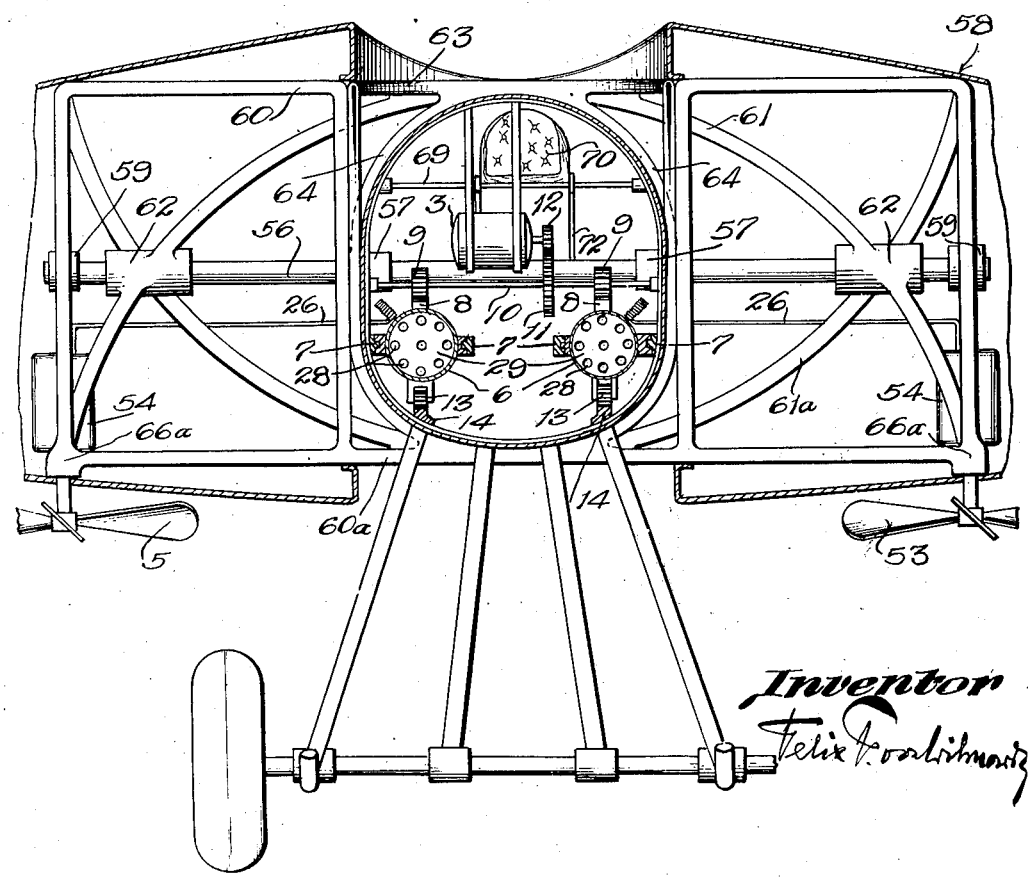

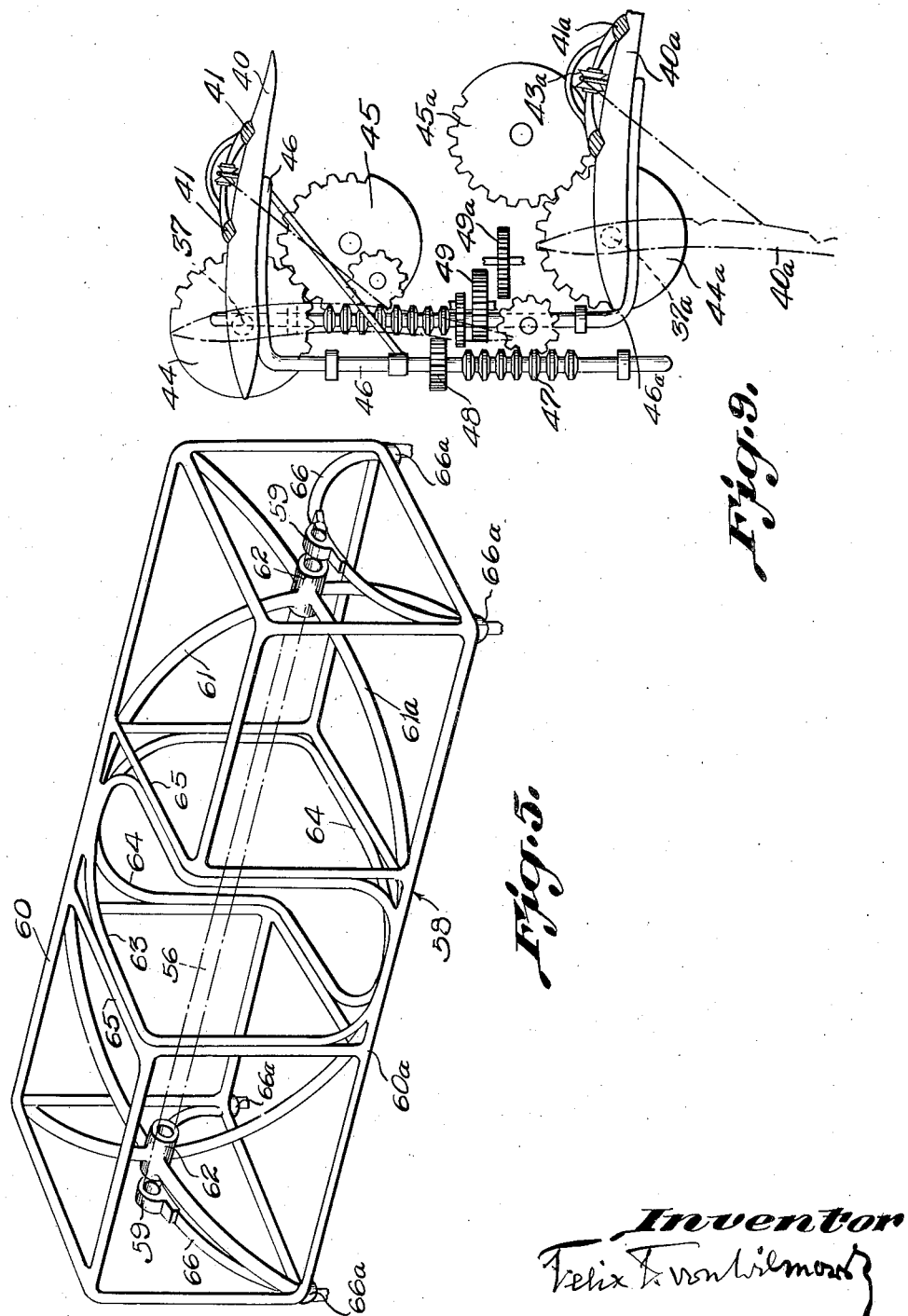

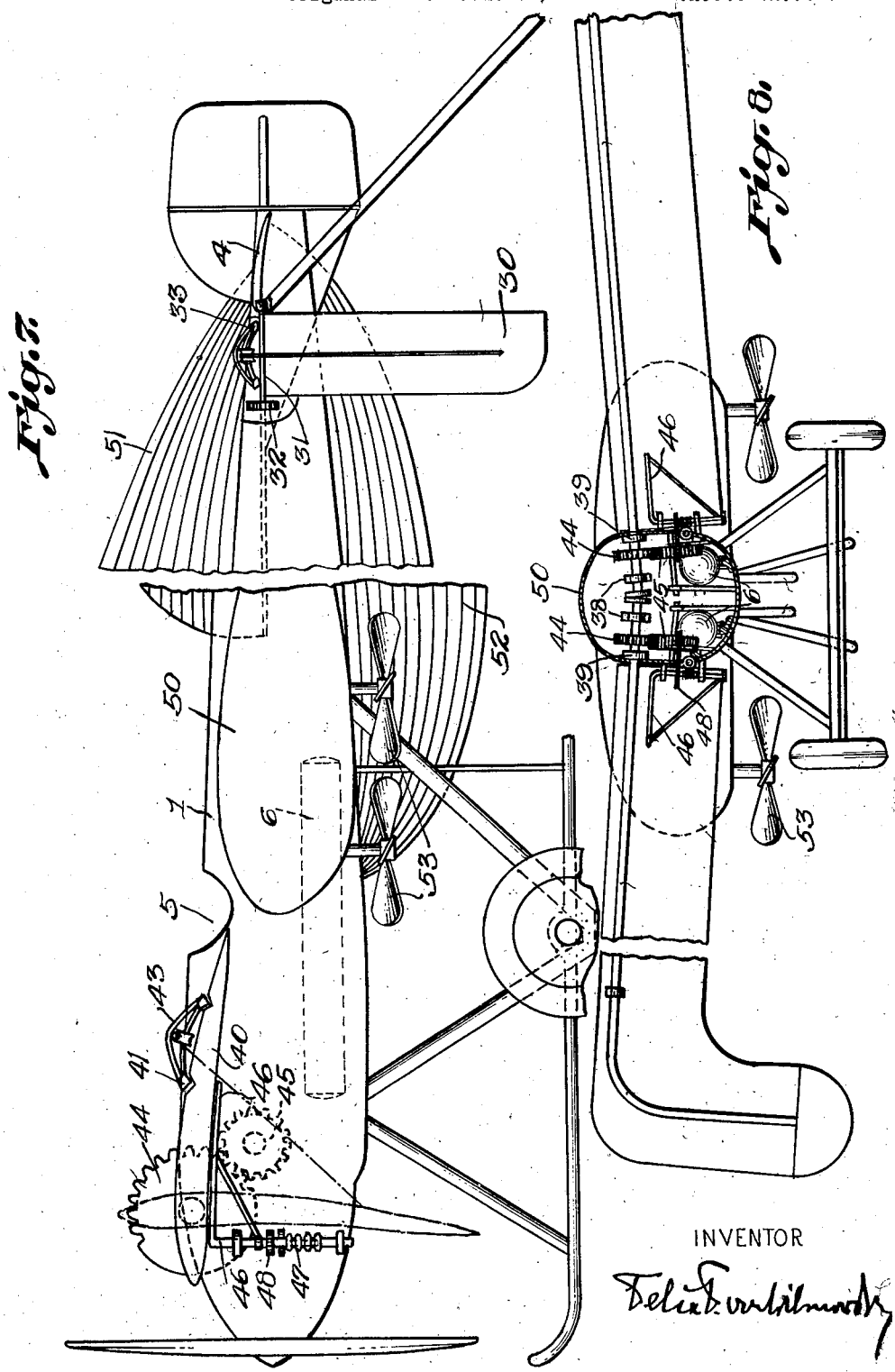

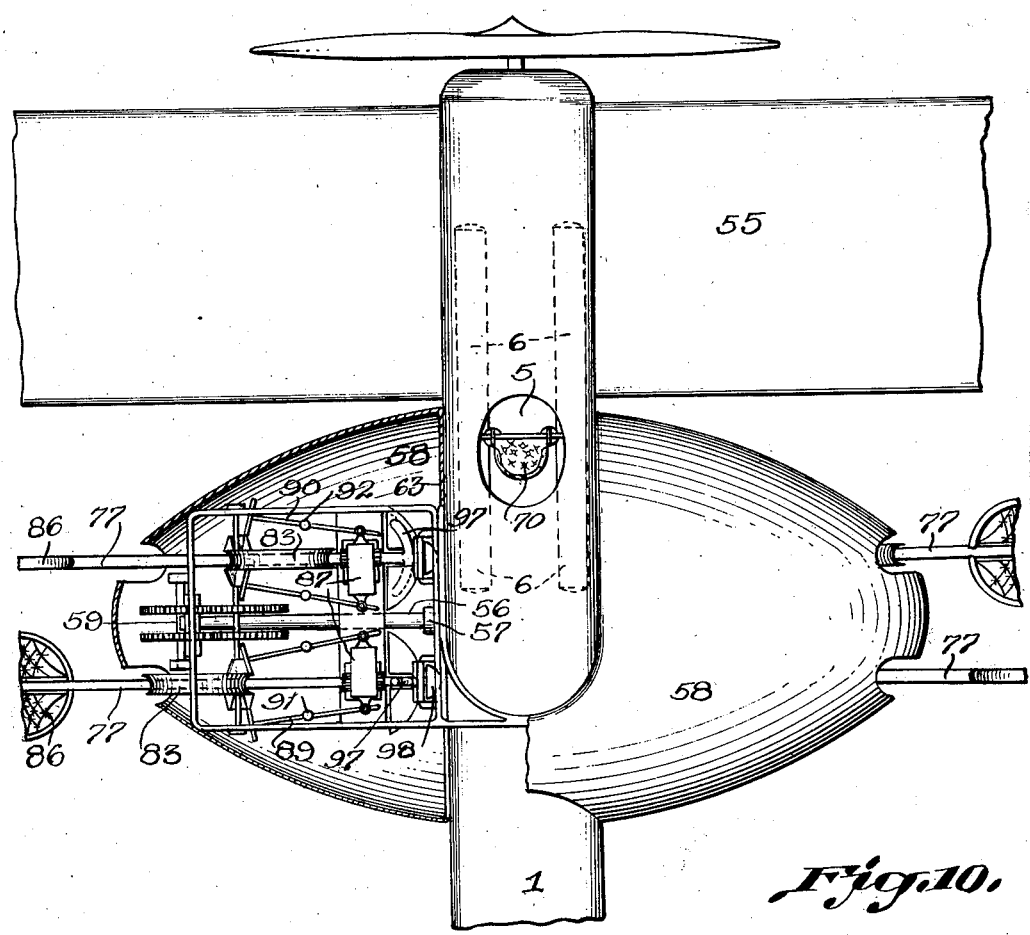
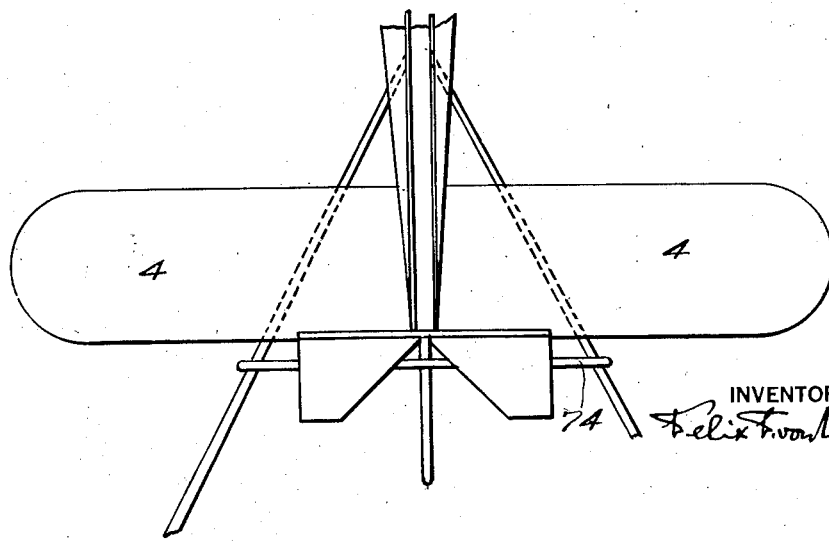

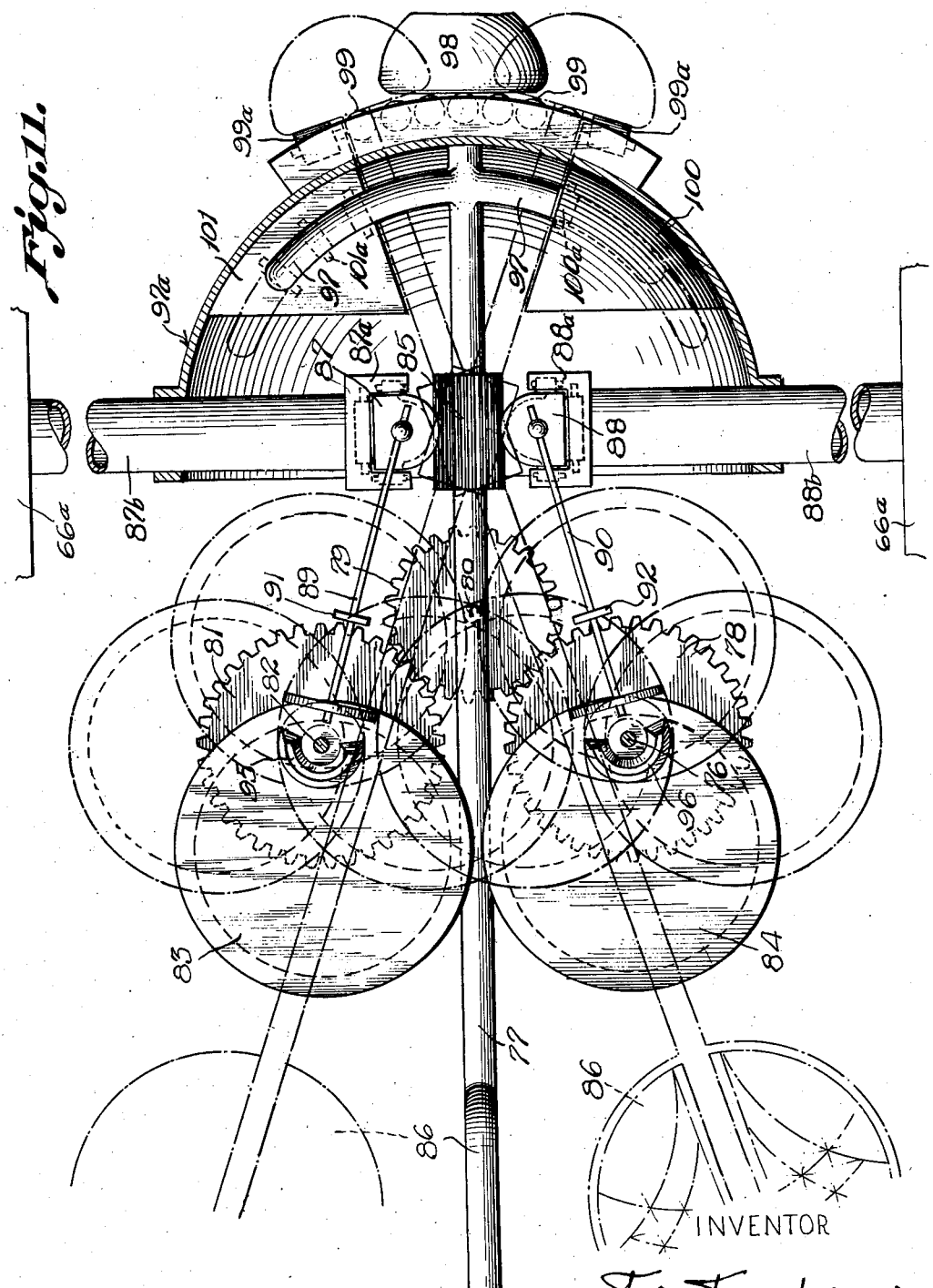

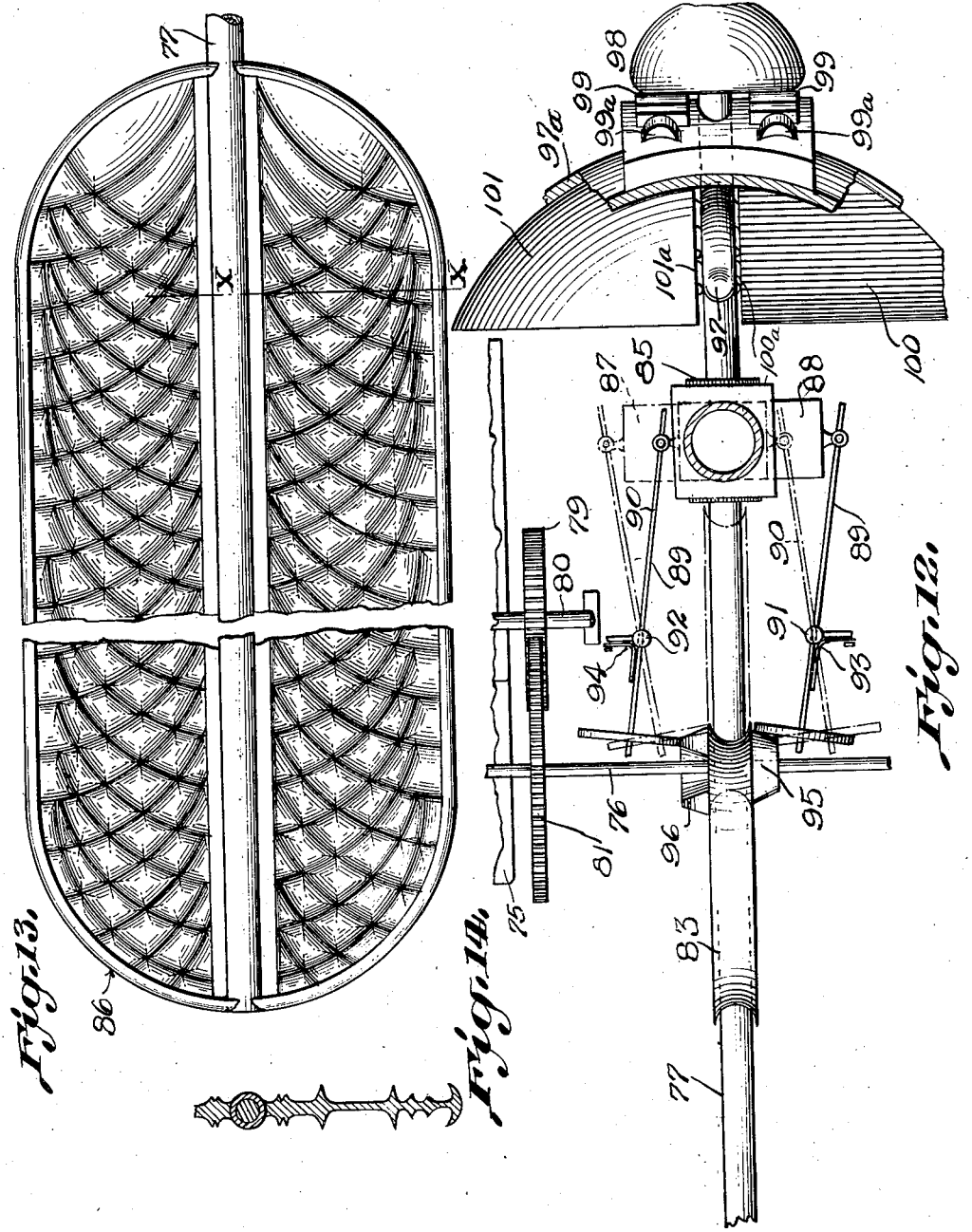

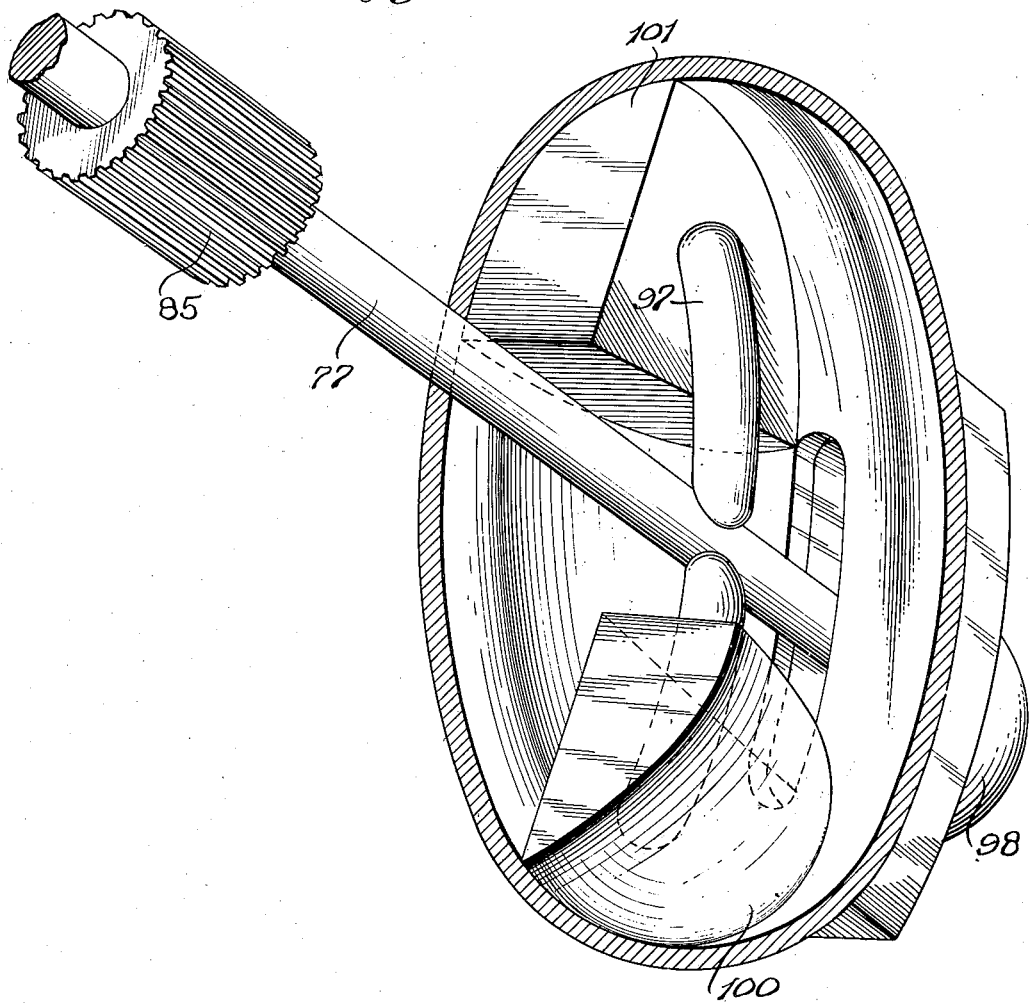

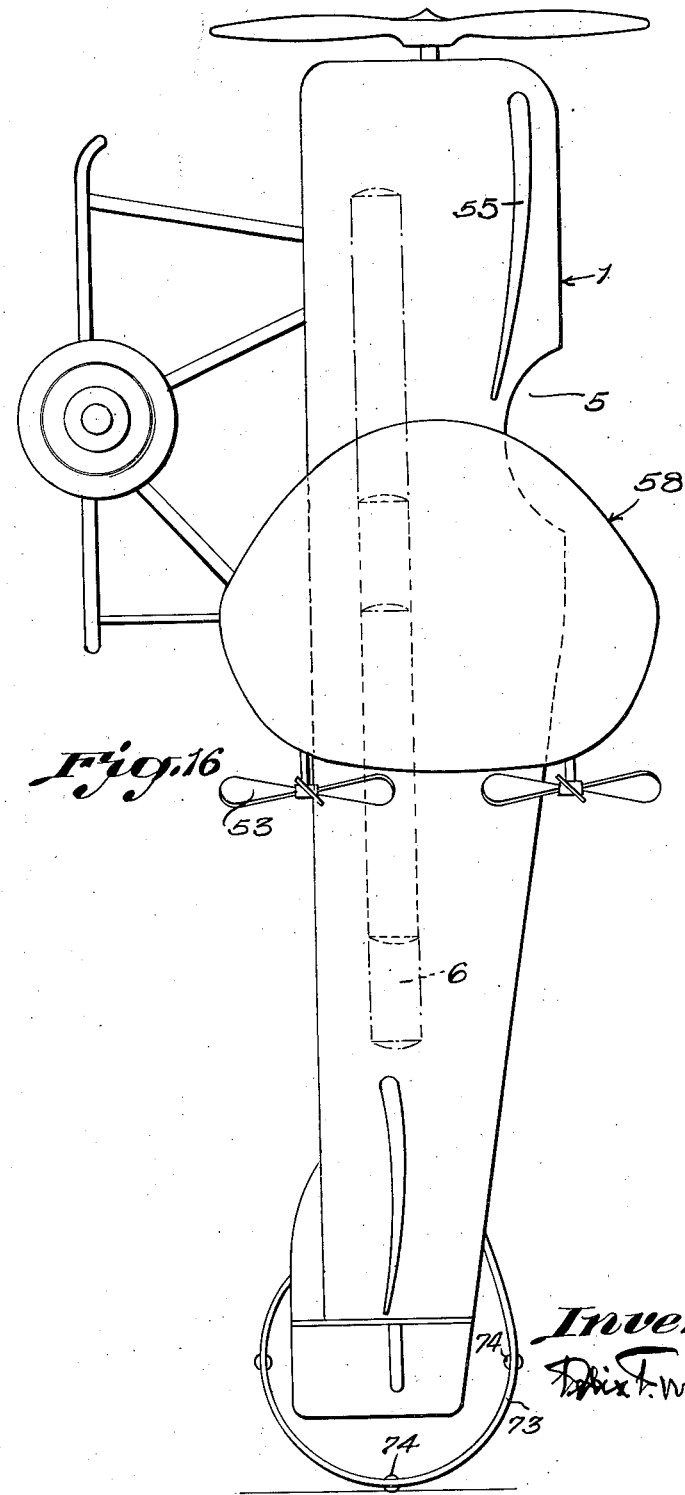

2,014,457

UNITED STATES PATENT OFFICE 2,014,457

HEAVIER-THAN-AIR FLYING MACHINE

Felix F. von Wilmowsky, New York, N. Y.

Application June 30, 1930, Serial No. 465,620
Renewed July 25, 1935

16 Claims. (Cl. 244—15)

By the new means hereinafter described and continued to be claimed—which were first described and claimed by me in the application filed on February 7, 1923 (informally filed on October 7, 1922), Number 617,640 of the Series of 1915—the operator of an aeroplane is enabled to rise from his position on the ground or water vertically into the air without "taxying" or running along the ground or water in order to gather the speed which generally is necessary for a gliding flight with an aeroplane and to travel through the air slowly and to alight vertically upon an appointed spot lightly and without any subsequent run over the land or water.

The new means involve a combination of forward-driving means and upward-driving means—preferably several of each kind, operating while normally in action around and, proportionally or in their effect, equidistant from the temporary or permanent centre of inertia of the machine—, with means which, while the machine is ascending or descending with the aid of the upward-driving means, effect a resultant force that acts as if it were at the centre of the vertical foreign displacing force (gravity and air resistance or air pressure combined), thus tending to sink or to lift the machine vertically in the air; the combination may include aerofoils whose resistance to air pressure and whose carrying effect can be adjusted together with the aforesaid gradual shifting of the centre of inertia of the machine. The combination is so arranged that while the machine is rising or alighting or flying in any position or direction, fast or slow, the upward-driving means do not interfere with or are interfered with by the forward-driving means or by aerofoils. If the upward-driving means of the machine have sufficient vertical lifting force for ascending vertically while the trunk of the machine is horizontal, I have the upward-driving means in a structure or frame in the centre of the machine, or between the front and rear aerofoils, rigidly fixed, and I equalize the resistance of the air to the vertical ascending and descending of the fore part and of the rear part of the machine by suitable means, say, by reducing and lengthening or spreading out either the front part or the tail of the machine; if there are aerofoils, I adjust them by reducing or folding and by enlarging or expanding them, or by shortening and increasing the distance of the aerofoils from the centre of the machine. If the upward-driving means of the machine have not sufficient lifting force even when located by the sides of the trunk or between aerofoils for ascending in substance vertically with the aerofoils horizontal, I give to the aerofoils (or to so much of the same as may be necessary) during the ascending of the machine with the aid of the upward-driving means a suitably inclined or vertical position. If the upward-driving means of the machine have enough lifting force for ascending in substance vertically with the trunk of the machine but not with the aerofoils horizontal, I swing the aerofoils alone to a suitably inclined or vertical position. If the upward-driving means of the flying device are not sufficiently powerful for a substantially vertical ascent with the trunk of the machine horizontal, I have the upward-driving means in a frame or structure or cage or container which permanently and while ascending with the aid of the upward-driving means is connected with the trunk of the machine exclusively through a single axis, which may be represented by pivots or an axle, so that the trunk and the lifting structure can swing through an angle preferably of ninety degrees in relation to each other; during the ascending with the aid of the upward-driving means the lifting structure, ballasted, remains horizontal while the trunk of the machine assumes a suitably inclined or vertical position. If the upward-driving means of the machine have not enough lifting force for hovering with the trunk of the machine horizontal, I resort to the swinging into the substantially vertical position of the trunk even for alighting. In this type of machine I prefer to have the centre of the forward-driving means in the line of the longitudinal axis of the machine.

In the drawings hereto annexed I have specified some aeroplane devices which apply the new combinations herein above characterized and which illustrate the use of my inventions with aeroplanes. However, I do not limit myself to aeroplanes; my new combination of a frame carrying a forward-driving means and an upward-driving means, the said driving means being permanently connected through an axis passing through the frame, apply generally to heavier-than-air flying machines with or without aerofoils.

Of the drawings hereto annexed,

Figure 1 is a top plan view, partly in section, with parts that have been removed indicated in dash and dot lines, outlining the fore part and centre of a monoplane, with a central structure in form of a cage for the upward-driving means swinging around an axle fixed in the fuselage; with gradually adjustable centre of inertia of the flying device so as to be at the will of the pilot on either side of the axle, fore or aft; and with a pivoted pilot's seat. The central swinging structure is shown locked in the fuselage by bolts. The locations merely of the several engines are shown. The extreme forward position of the gradually shiftable loads in the horizontal fuselage and a part of the lower frame of the cage are shown by broken lines. Stumps only of the front aerofoils and of the rear part of the machine are shown. The lateral extremities of the cage are broken off.

Figure 2 is a diagram, partly sectional, of the side elevation of the fore part and centre, and Figure 2a of the tail, of a monoplane of the same type as the one outlined in Figure 1. The central swinging cage is shown locked with the fuselage by bolts. The locations merely of the cage engines are shown. The fuselage of the fore part is broken away so as to show the extreme forward position of the gradually shiftable weights; the weights are shown in dot and dash lines in the rear part.

Figure 2b is an enlarged detail side view of one of the rear arches such as are shown in Figure 2a; it is fitted with aquatic gear; a part of the surface of the arch is broken away so as to show the wheels inside and the attachment of the pontoon to the cable.

Figure 2c is an enlarged diagram of the cross-section of the arch shown in Figure 2b along the line 2c—2c.

Figure 6:
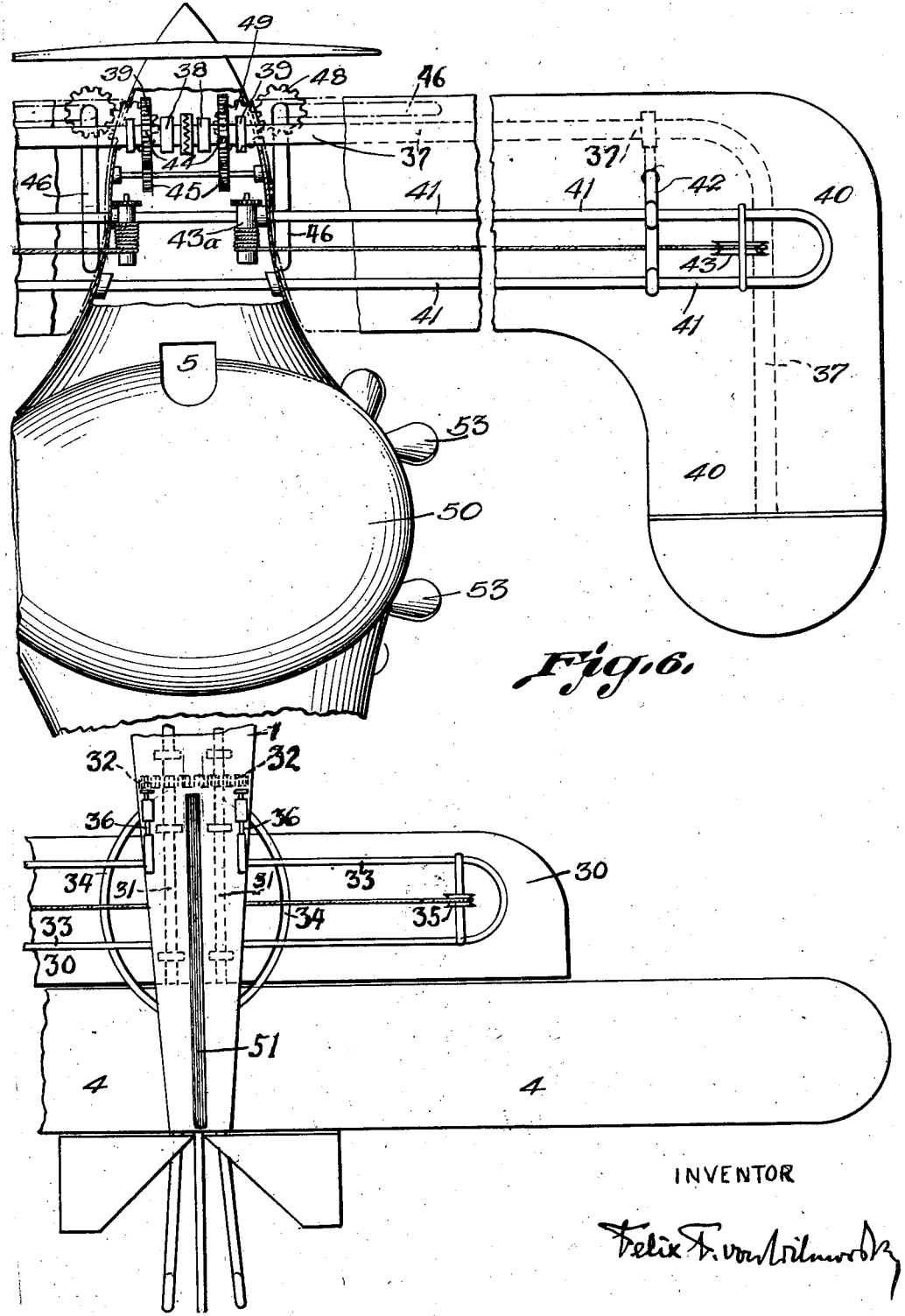

Figure 3 is a sectional diagram of the front elevation of a monoplane of the same type as is outlined in Figures 1 and 2. It shows the mechanism by which the gradually shiftable weights represented by cylindrical tanks are shifted forward and rearward in the trunk of the machine. The gradually shiftable weights in the fuselage and the outside of the fuselage and of the cage are shown in section. The extremities of the cage are broken away.

Figure 4 is a diagram, partly sectional, of the front elevation of the flexible outlet tube of a lengthy container of fluids serving as a gradually shiftable weight in a heavier-than-air flying machine, and of the mechanism whereby the flexible tube is automatically wound upon a roller and is again unwound in proportion as the tube outlet or nozzle (not shown) draws away from the container outlet and again approaches the container outlet, the two outlets thus being elastically mobile in relation to each other through the automatic coiling of the tube whenever the tube outlet and the container outlet approach each other. The flexible tube is shown running up slantingly and is broken off.

Figure 5 is a perspective view of the skeleton or frame of the square cage of a monoplane of the type shown in Figures 1 and 2. The axle connecting the cage frame with the fuselage is shown in dot and dash lines.

Figure 6 is a top plan view of the fore part and centre and of the tail of a monoplane fitted with a terrestrial gear; with fixed upward driving means and adjustable centre of inertia, and with enlargeable and extendible aerofoils and with a high undercarriage and long rear skids; the front aerofoils are on turning spars, with rear extensions of the front aerofoils; the rear aerofoils are fixed, with auxiliary rear aerofoils on turning axles along the longitudinal axis of the machine. All of the aerofoils are in the horizontal position. The horizontal turning spars carrying the front aerofoils are shown in mesh, when they will turn synchronously. The active position of the shoulder supports of the front aerofoils is shown in dotted lines; the inactive position of the shoulder supports is shown in dot and dash lines. The aerofoils are partly broken away on the left side of the machine.

Figure 7 is a side elevation view of the fore part and centre and of the tail of a monoplane of the same type as the one which is outlined in Figure 6, with foldable crest and centre plane; auxiliary rear aerofoils on turning axles along the longitudinal axis of the machine are shown in their vertical position; the vertical position of the front aerofoils during vertical ascending is shown by broken lines. Stumps only of the two long rear skids are shown.

Figure 8 is a front elevation view, partly in section, of a monoplane of the same type as the ones which are outlined in Figures 6 and 7, with the front aerofoils in their vertical position and the shoulder supports in their inactive position; the gradually shiftable weights or loads are shown in the section of the fuselage; parts of the front aerofoils are broken away.

Figure 9 is an enlarged detail view of the side elevation of the shoulder pieces and mechanism by which the front aerofoils of a biplane of the type shown in Figures 6, 7 and 8 are secured in their horizontal position; the vertical position of the aerofoils is shown by dash and dot lines.

Figure 10 is a top plan view of the fore part and centre and of the tail of a monoplane fitted with a terrestrial gear, with adjustable centre of inertia and with the mechanism reciprocating four humming feathers for upward-driving, which is contained in a central swinging structure, part of whose outside covering is broken away. Only the stems or rods and stumps of the blades of the feathers and of the front aerofoils and the rear arches are shown.

Figure 11 is an enlarged detail side elevation view of the mechanism by which the stems of the humming feathers outlined in Figure 10 are reciprocated and turned about and anchored. Only the rod or stem and a part of one feather are shown. The mechanism is shown in the position which it assumes while the humming feather is horizontal during its down stroke; the two extreme positions of the feather-rod with its arms or anchor and its terminal knob and the varying positions of the eccentric wheels are shown in broken lines.

Figure 12 is an enlarged detail top plan view of the mechanism by which the rods of the humming feathers shown in Figures 10 and 11 are reciprocated and turned about and anchored (only the stump of one feather is shown); the mechanism is shown in the position which it assumes while the feather is horizontal during its down stroke; the extreme positions of the arms or anchor and of the eccentric wheels are shown by dotted lines; the shifted position of the turning mechanism is shown in broken lines; the engine activating the feather is merely indicated by a fragment of its case.

Figure 13 is a plan view of a humming feather such as is shown in Figures 10, 11 and 12, showing the system of transversal and slanting serrated ridges and cellular ribbing of the blade surfaces—identical designs being on either face—of the humming feathers.

Figure 14 is an outline of the section laid along the line $x$—$x$ through the blade of the humming feather shown in Figure 13; both faces and both sides of the blade being equal, only a stump of the right side of the section is shown.

Figure 15 is a perspective view of the mechanism by which the turning of the rear end of a humming feather such as is shown in Figures 10, 11, 12, 13 and 14 is controlled.

Figure 16 is a side elevation view of a monoplane of the type which is shown in Figures 1, 2 and 3, standing on the projecting rear joint of its terrestrial rear arches, ready for vertical ascent.

Like numerals of reference point out corresponding parts in every figure. In the drawings, 1 denotes the fuselage or trunk of the machine; 2, the forward screw propeller; 3, the engine of the starter, which is utilized where mechanical power is needed incidentally; 4, 4, the rear aerofoils; 5, the cockpit; 6, 6, the gradually shiftable weights or loads, represented here by tanks, which are used for changing and adjusting the centre of inertia of the machine; the loads 6, 6 are guided by lateral grooved flanges between rails marked 7, 7, which are fixed in the frame of the fuselage 1; 8, 8 denote broad racks running along the backs or tops of the loads 6, 6; these racks are in firm mesh with the broad toothed wheels 9, 9, on the axle marked 10; the toothed wheel 11, in the middle of the axle 10, is in mesh with the toothed wheel marked 12, through which the operator with the help of the starter engine 3 can shift the loads 6, 6 on the broad toothed wheels 13, 13 along the grooved racks 14, 14—the latter are fixed in the skeleton or frame of the fuselage—rearward and foreward so as to adjust the centre of inertia of the machine either foreward for an exclusive gliding flight or rearward for exclusive climbing or descending with the aid of the upward-driving means, or for a slow flight; in the last said case the upward-driving means cooperate with the horizontal propelling means and with the aerofoils. 15 denotes a base plate with a short tubular outlet fixed in it, in the side of the tank 6; fixed in the base plate 15 and its short outlet is the tube marked 16; it extends athwart the longitudinal frame, preferably the axis, of the machine. 17 denotes a short tubular sleeve around the tubular outlet of the base plate 15; it bears with an inner flange against the outer flange of the outlet and is thus held in place while free to turn around. To the short sleeve 17 is firmly joined the long sleeve marked 18; the latter fits loosely upon the flange 19 of the tube 16, near its mouth; though thus fixed longitudinally, the sleeve 18 can turn freely around the tube 16 on the ball bearings marked 20 and 21; the balls are held in place by the rings 22 and 23, which are fitted into and fixed to the sleeve 18. Accurately fitted to the sleeve 24 and fixed in it airtight, and carefully adjusted to the mouth of the tube 16 by means of the sleeve 24, which is fixed inside of the sleeve 18, and so as to turn around the mouth gasproof and yet easily, is a curved tube marked 25; the latter leads back to the periphery of the sleeve 18. To the end of the curved tube 25 is gasproof attached a flexible tube marked 26, which can be coiled around the tube 18; the tube 26 carries the contents of the tank 6 to the engines or where else it may be desired. Between the tube 16 and the sleeve 18 is a free space or tube-shaped chamber; this chamber is occupied by a spring marked 27, coiled around the tube 16; its one end is fixed to the tube 16, its other end to the sleeve 18; the coil spring is kept under tension so that, when the flexible tube 26 is pulled off the sleeve 18, the tension will wind it up again as soon as the pull relaxes. The tank is divided into small compartments by thin vertical partitions (Figure 2); these partition plates marked 29 are perforated by small holes marked 28, 28, through which the liquid can pass from one end of the tank to the other but gradually: a rushing of the liquid bulk with consequent sudden shifting of the centre of inertia of the machine is thus excluded. The perforations of the partition discs inside of the tanks are marked on the faces of the tanks in Figure 3.

In Figures 6 and 7, 30, 30 denote auxiliary rear aerofoils fixed on poles or axles 31, 31; the latter are parallel to the longitudinal axis of the machine. Such auxiliary rear planes serve for equalizing the resistance of the air encountered by a machine which is to climb or descend with the aid of the upward-driving means vertically with its body and its aerofoils horizontal and generally for changing and adjusting the centre of vertical pressure of the machine, which with the type of machines here described lies during slow gliding flight naturally in front of the lens-shaped central lifting frame or structure. 32, 32 denote toothed wheels, in mesh with each other, on the poles 31, 31; one or both of the latter are adjusted either directly through levers or through intermediate gearing from the cockpit 5, where the operator controls the synchronous—and by putting the wheels 32, 32 out of mesh, the separate—turning of the poles 31, 31. 33, 33 denote lateral horizontal frames firmly fixed in the frame of the machine; together with the curved horizontal bars 34, 34, which are likewise fixed in the frame of the fuselage 1, they restrict the upward movement of the planes, 30, 30. Bridges on the frames 33, 33 carry pulleys marked 35, 35; over these run cables, whose ends are fastened in the ribbing of the planes 30, 30; the cables run over the wheels 35, 35 to drums near the cockpit 5; the drums are controlled by the operator, the cables aiding him in the vertical turning of the planes 30, 30. 36, 36 denote bolts or bars held in sleeves which are fixed below the curved bars 34, 34; the bolts 36, 36 can be pushed into sleeves of the planes 30, 30; their movement is controlled from the cockpit 5; when pushed into the planes 30, 30, they lock the same in their horizontal position to the fuselage 1. 37, 37 denote the turning main spars of the front aerofoils; the main spars preferably consist of steel tubes filled with sections of strong bamboo having the same length as the tubes. The inner ends of the main spars 37, 37 are confined in the bearings 38, 38 and 39, 39, which are firmly anchored in the frame of the fuselage 1. 40, 40 denote the front aerofoils, fixed to the main spars 37, 37; their tips are extended rearward. The main spars 37, 37 are bent rearward near their outer extremities and, flattened, run along the middle of the rear extensions of the planes 40, 40, to the line where the ailerons begin; if parallel to the longitudinal axis of the machine, the rear extensions of the planes 40, 40 are preferably slightly concave. 41, 41 denote lateral frames of steel; like the frames 33, 33, they serve to restrain the upward movement of the aerofoils 40, 40, being firmly anchored in the frame of the fuselage 1. The frames fit into grooves on the backs of the wings 40, 40; each frame 41 carries a cross bar marked 42; at the end of the forward extension of the latter is a bearing in which the main spar 37 turns. The frame 41 carries, besides, near its outer end on another cross bar a pulley marked 43; over this pulley 43 runs a cable, whose one end is attached to the ribbing of the wing 40 and whose other end is fixed to the drum marked 43a and is under the control of the operator; these cables aid in raising and lowering the planes 40, 40 and hold the same fast to the frames 41, 41. 44, 44 denote large and strong toothed wheels on the inner ends of the main spars 37, 37 between the bearings 38 and 39; they serve for the turning of the main spars 37, 37 through an angle of 90 degrees; they serve also as anchors for wires or cables stiffening the spars; they are in mesh with two other toothed wheels marked 45, 45. The axles of the wheels 45, 45 are turned by the starter engine 3 and are under the control of the operator. 46, 46 denote knees of steel; each knee carries along its vertical leg a circular rack, which is in mesh with the vertical toothed wheel marked 47; through this wheel 47 the operator raises and lowers the knee 46. The vertical leg of the knee 46 carries, besides, a horizontal toothed wheel marked 48, which is in mesh with auxiliary gearing controlled by the operator; through the wheel 48 the knee 46 is turned about horizontally. The horizontal leg of the knee 46 fits into the ribbing on the under side of the plane 40; after the planes 40, 40 have been raised to their horizontal position, the knees 46, 46 are turned from their inactive position along the main spar 37, 37 and are raised through their circular racks so as to fit into their grooves athwart the planes 40, 40, serving as supports for the shoulders of the main spars and as locks for the planes; before the planes 40, 40 can be turned down again, the knees 46, 46 must be lowered and be turned about through their wheels 48, 48, which are in mesh with the wheels 49, 49, controlled by the operator. In Figure 9, the numbers 37a to 49a denote corresponding parts of the lower aerofoil of a biplane. In Figures 6, 7 and 8, 50 denotes the fixed frame which holds the vertical lifting means; its skeleton is designed so as to transmit the vertical lifting effect directly to the frame of the fuselage 1; the frame 50 must be evenly balanced and must be solidly connected with the frame of the fuselage 1 so as to be indifferent to the frontal air pressure during gliding flight; its outlines or hull should follow stream lines as closely as may be practicable. 51 denotes a folding or collapsible crest, which is raised along the back of the machine when the machine is to descend vertically, especially in alighting. 52 denotes a centre plane; it is unfolded along the under side, below the longitudinal axis of the machine when the latter is to climb vertically. The rear skids together with the under-carriage or pontoons must keep the body of the machine sufficiently high above the ground or water to prevent any fouling of the aerofoils in their vertical position; lateral skids or pontoons may be inserted below the frame 50.

In Figures 1, 2, 3, 6, 7 and 8, 53, 53 denote rotary upward-driving propellers; 54, 54, the locations of their engines; if carried in a swinging lifting cage (Figures 1, 2, 3, 10, 16), the propellers must be as far away from the longitudinal axis of the machine as may be practicable, so as to be outside of the slip-stream of the forward screw propeller 2; the upward-driving propellers 53, 53, in pairs coupled to an engine on either side of and equidistant from the longitudinal axis of the machine, must be of sturdy build and be strong enough by themselves alone to carry securely the weight of the entire machine.

In the Figures 1, 2, 3, 10 and 16, 55, 55 denote the fixed front aerofoils. 56 denotes the axle, which is fixed at the points 57, 57 in the frame of the fuselage 1. It connects the lifting structure 58, which may be in the form of a skeleton frame as is here shown or enclosed as a cage as has been indicated here, with the skeleton or frame of the fuselage 1; the structure 58 swings around the axle 56 in the bearings at the points marked 59, 59; it can swing through an angle of 90 degrees in relation to the fuselage 1. Pivots can take the place of the axle 56; but I prefer one straight rod or tube of forged iron which passes through the skeleton of the fuselage 1 and the cage 58 and through the longitudinal axis of the machine, and which by rings fixed around it is confined in its position in the sleeves or bearings fixed in the skeletons of the fuselage and of the cage 58. In the centre of the lifting cage 58 and also in the upper central part of its front and in the lower central part of its rear, space is left free for the fuselage 1, and the inner frame of the cage 58 is designed so that the cage can swing freely around the axle 56 through an angle of 90 degrees in relation to the fuselage 1 and that the upward-driving propellers, rotary or reciprocating, can carry securely the weight of the fuselage 1 in its vertical position with its fixed aerofoils. 60 denotes the upper rear beam or plate, which forms the rear part of the top of the cage 58; 60a, the lower front beam or plate, which forms a part of the front of the bottom of the cage 58; the two beams or plates 60 and 60a are vertically over the axles or fulcrums of the four upward-driving propellers and are supported by the propellers while the same are working; the beams connecting the plates 60 and 60a serve to support and carry the engines driving the propellers. 61 denotes an arch or curved beam whose middle is fixed to the middle of the upper rear beam 60 and whose two extremities are fixed to the lower front beam 60a; 61a denotes an arch or curved beam like the one marked 61, and whose middle is fixed to the middle of the lower front beam 60a; its two extremities are fixed to the upper rear beam 60. The two beams 61 and 61a pass diagonally in the same plane through the interior of the cage 58; the axle 56 passes through them at the points marked 62, 62; at these points the parts of the arches around the axle 56 are reinforced and carry roller bearings, in which the axle 56 runs. 63 denotes a curved beam or strong tube whose ends are joined together so that the beam or tube 63 forms a sort of closed longish oval; this oval is bent at the middle of its long sides so that its two more pointed halves or ends lie in two different planes forming substantially a right angle; its upper and rear end is fixed to the middle of the upper rear beam or plate 60; its lower and front end is fixed to the middle of the lower front beam or plate 60a. This beam or tube 63 encircles the fore part of the fuselage 1; the latter is in contact with the lower and front part of the beam or tube 63, which is in a substantially vertical plane, while it is in its gliding position; the fore part of the fuselage 1 goes upward with its back into contact with the upper and rear part of the beam or tube 63, which is in a substantially horizontal plane, when the fuselage 1 assumes its ascending or descending, or vertical position. 64 denotes a curved beam or strong tube whose extremities are joined together so that the beam or tube 64 forms a sort of closed longish oval similar to the beam or tube 63; it is bent in a substantially like manner as the beam or tube 63. Its lower and front end is fixed to the middle of the lower front plate or beam 60a; its upper and rear end is fixed to the middle of the upper rear plate or beam 60. This curved beam or strong tube 64 encircles the rear part of the fuselage 1; the latter is in contact with the upper and rear part of the beam or tube 64, which is in a substantially vertical plane, while it is in a gliding position; the rear part of the fuselage 1 goes downward with its bottom into contact with the lower and front part of the beam or tube 64, which is in a substantially horizontal plane, when the fuselage 1 assumes its vertical position. The two curved beams or tubes 63 and 64 together thus form a sort of crib (more or less quadrangular when seen from the side) within which the fuselage 1 can swing from the horizontal position to the vertical position and vice versa. 65, 65 denote transversal beams on either side of the rings 63 and 64 and running from the upper front corners of the ring 63 to the lower rear corners of the ring 64; where the axle 56 passes through them, they are reinforced and carry roller bearings. 66, 66 denote beams which run from sleeves marked 66a of the vertical propeller axles or stems to the horizontal cage axle 56 and transmit through bearings directly the effect of the upward-driving means to the axle 56. The construction of the cage may be simplified where that is practicable within safe limits. 67, 67 denote bolts held in sleeves in the frame of the fuselage 1 and which can be pushed through sleeves marked 68, 68 and fixed in the frame of the lifting cage 58; the cage 58 is thereby locked with and is made a rigid part of the fuselage 1. 69 denotes an axle on which the pilot's chair marked 70 is fixed so as to swing around the controls and instruments of the cockpit 5; the latter implements must be suitably designed and arranged. 71, 71 denote counterweights which are attached through the levers marked 72, 72 to the chair 70; they cause the chair with the pilot in it to swing around the controls and instruments through an angle of about 60 degrees when the fuselage 1 assumes its vertical position. 73, 73 denote two divergent rear arches; they are held together by horizontal bands 74, 74; the strong and projecting joints of the cross-bands 74, 74, by which the same are attached to the arches 73, 73, serve as relief points or supports for the fuselage 1 when the same, while rising from or alighting upon the ground, is in a vertical or a slanting position in contact with the ground. When the machine is fitted with aquatic gear, the rear arches 73, 73 carry shiftably attached to them the rear pontoons designated by the numeral 110 upon which the machine may repose while the fuselage 1 rising from or alighting upon the water is in a vertical or a slanting position in contact with the water. These pontoons 110 may be fixed by means of steel rods 111, 111 to cables 112, which run in grooves 113 along the outer side of the arches 73, 73 over the little grooved wheels 114, 114, fixed within the body of the arches; the cables are guided, besides, along the arches by little lateral projections or plates 115, 115 fixed in the arches 73, 73. The pontoons can thus be shifted along the arches by means of the cables, which latter are controlled from the cockpit, so as continually and firmly to support, whenever support is needed, the rear part of the fuselage 1 while the machine in starting to fly or in alighting is swinging from the horizontal position to the vertical one and vice versa. The two cable grooves may be screened or covered, excepting the spaces along and below which the pontoons are to move or to be shifted. The arches 73, 73 serve as rear skids and to protect the rear part of the machine when the fuselage 1 assumes its vertical position while in contact with the ground or water: they must therefore be strong enough to support the weight of the machine in its vertical position somewhat in the manner of ribs. The upward-driving means should exert in all cases their effect as directly upon the axle 56 as may be practicable. The beams or tubes transmitting the lifting effect to the axle 56 are preferably of forged iron; the other parts of the lifting structure 58 are preferably of duraluminium.

In Figures 10, 11, 12, 13, 14, 75, 75 denote engine locations on either side of the swinging cage 58; each engine turns an axle, marked 76, 76. Since the mechanisms reciprocating and turning the rods marked 77, 77 of the humming feathers of the machine, which are activated by the axles 76, 76, are identical in all of their parts, the parts of only one of the mechanisms shown in Figures 10 and 11 have been marked with numerals. 78, 78 denote pairs of toothed wheels on the axles 76, 76, on either side of each engine 75; they are in mesh with toothed wheels marked 79, 79 on the short axles marked 80, 80. The wheels 79, 79 are in mesh with toothed wheels marked 81, 81 on the axles marked 82, 82. The axles 76, 76 and 82, 82 turn at exactly the same velocity; the axles on the same side of the cage 58 turn also in the same sense, the axles on opposite sides in opposite directions. The axles 76, 76 and 82, 82 carry each two eccentric wheels; the two on the upper axles 82, 82 are marked 83, 83; the two on the lower axles 76, 76 are marked 84, 84. These eccentric wheels are all of exactly the same size and weight; the two eccentric wheels fixed on the same axle extend (alternately) in opposite directions—that is to say, so that when one of the wheels on the axle has its highest position, the other wheel has its lowest position. Each couple of eccentric wheels formed by 83 and 84 rotates in the same plane; the two wheels turn so that the two wheel rims are at all times almost in touch with each other. The rims of the wheels 83, 83 and 84, 84 have half-circular grooves; in the practically tubular space formed by each pair of opposite rims of the eccentric wheels is confined the round rod or tube 77, which forms the stem of a humming feather. The rod 77 has its fulcrum at the point marked 85, where it carries a fluted sleeve. The fulcrum 85 is located so that the two eccentric wheels 83 and 84, which confine between their rims the stem 77, carry the latter reciprocatingly in a vertical plane from an angle of approximately 20 degrees above the horizontal to approximately 20 degrees below the horizontal. The stems 77, 77 extend laterally outside of the lifting cage 58 at a right angle to the longitudinal axis of the machine; the outer halves of the stems are slightly curved; outside of the cage 58 the stems carry broad blades marked 86, 86, of an aspect ratio of about 6; the surface of the blades 86, 86 will be specified hereinafter. 87, 87 denote ridged half-cylinders which are fixed in vertical direction above the fluted sleeves at 85, 85; 88, 88 denote other ridged half-cylinders, of like size, shape and weight, which are fixed in the vertical direction opposite to the half-cylinders 87, 87 and below the fluted sleeves at 85, 85; each couple of half-cylinders 87 and 88, in cases marked 87a, 87a and 88a, 88a among roller bearings move horizontally simultaneously in opposite directions so as to turn the fluted sleeve at 85, with which they are in accurate and firm mesh, through 90 degrees; they reciprocate, with intervals which are timed so that the stem 77 is turned around through 90 degrees every time when its outer end with the blade 86 has almost reached its highest and its lowest position and so that the blade has turned horizontal at its highest position and has turned vertical at its lowest position. The turning of the blade 86 is thus done alternately in opposite directions, so that always the same face of the blade strikes the air down. The timing of the reciprocating half-cylinders 87, 87 and 88, 88 is done with the aid of the rocker-levers marked 89, 89 and 90, 90, all of the same shape, size and weight; the long inner arms of the levers 89, 89 are attached one to one side of the upper half-cylinder 87 and the other to the opposite side of the lower half-cylinder 88; the levers 90, 90 are attached with their long inner arms to the two other sides of the two half-cylinders. The fulcrums of the levers 89, 89 are marked 91; those of the levers 90, 90 are marked 92, 92. The outer short arms of the levers carry loose or idling wheels, whose rounded rims are rough and turn by friction; they are kept bearing against opposite sides of the eccentric wheels 83 and 84 by the springs marked 93 and 94. The wheels 83 and 84 have on either face through half of their circumference narrow ridges concentric to their axles 76 and 82 and located so that where the ridge on one face ends the ridge on the other face commences; the ridges are marked 95, 95 and 96, 96. When, the eccentric wheel 83 turning, its ridge 95 is slipping under and shifts the terminal friction wheel of the short outer arm of the lever 89, the terminal friction wheel of the short outer arm of the lever 90, which bears against the opposite face of the wheel 83, is leaving the ridge 96 on that face and the spring 94 makes the terminal wheel of the lever 90 bear against the level face of the wheel 83; the levers are thereby shifted, and the long inner arms of the levers move the half-cylinder which is between them and which they govern. At the same time the levers whose terminal friction wheels bear against the two faces of the eccentric wheel 84 shift the half-cylinder 88 in the opposite direction; between the two half-cylinders 87 and 88 thus moved in opposite directions the fluted sleeve at 85, which is in the firm grip of the two half-cylinders, and with the sleeve the rod 77 is turned about through 90 degrees. At the end of a half turn of the eccentric wheels 83 and 84 the levers 89, 89 reach the end of the ridge 95 and the wheels of the levers 90, 90 reach the beginnings of the ridges 96, 96. The levers are moved once more and between their long inner arms they shift the half-cylinders back to their first position; the fluted sleeve at 85 and with it the rod 77 is thereby turned through 90 degrees back to its first position. The blade 86 is thus turned about through 90 degrees alternately in opposite directions. If the blade 86 is to turn about through 90 degrees always in the same direction, I employ in the place of the two ridged half-cylinders 87 and 88 two wheels with broad rounded rims transversely deep-ridged, which are turned in intervals, each always in the same direction, and between them turn the fluted sleeve at 85 and the blade 86 around through 90 degrees. The ridged wheels which take the place of the half-cylinders 87 and 88 turn in the plane vertical to that of the eccentric wheels 83 and 84; the levers which take the parts of the levers 89 and 90 are shifted by plugs in planes which are parallel to that of the eccentric wheels, in a manner similar to the one which herein above has been described; the ridged wheels are locked after every advance so that they can turn only in one direction; the levers are returned by springs to their inactive position as soon as they have turned the ridged wheels. The lifting effect produced by the blades 86, 86 striking the air down is transmitted to the frame of the cage 58 and to the axle 56 at the fulcrums 85, 85 of the stem 77, 77 through the vertical beams marked 87b and 88b which support and confine the cylinder cases 87a, 87a and 88a, 88a.

On the inner side of the fulcrum 85 is a case or box or hemispherical housing (Figures 11, 12, 15) marked 97a, which confines the inner end of the stem 77 with its anchor-like arms 97, 97—they are curved concentrically to the pivot—and its terminal round knob 98. The knob 98 moves up and down vertically in a channel of the box, bearing against a string of rollers 99, 99. In the lower right hand corner of the anchor box is a block marked 100; it is bevelled on its upper side; another block, marked 101, of like size but bevelled on its lower side, is in the upper left hand corner of the anchor box. The planes of the bevelled surfaces of the two blocks 100 and 101 are radial to the fulcrum 85; they conform between them to the vertical angle through which the stem 77 travels when reciprocating; the bevelled surfaces are padded with india rubber or other soft material. The inner vertical faces of the blocks 100 and 101 carry each a row of roller bearings marked 100a, 100a and 101a, 101a and set radially to the fulcrum 85; the cylindrical anchorlike arms of the stem 77, which are curved concentrically to the fulcrum 85 in the plane that is vertical to the plane of the blade 86, move up and down between the blocks 100 and 101; while the blade is descending in a horizontal position striking the air with its face, the anchor arms 97, 97, vertical, go up between the vertical faces of the two blocks, bearing against the rollers 100a, 100a and 101a, 101a; while the blade is ascending edgewise or in a vertical position and therefore without much resistance of the air, the anchor arms descend flat or in a horizontal position and free between the two bevelled surfaces of the blocks 100 and 101, until one of the arms strikes against the bevelled top surface of the lower block 100; its one anchor arm being checked, the pole 77 turns around 90 degrees until it strikes with its arm 97 against the roller bearings 101a, 101a on the vertical side of the upper block 101; at the same time its other arm 97 strikes against the roller bearings 100a, 100a on the vertical side of the lower block 100. The arms 97, 97, on edge, glide now upward between and along the roller bearings on the vertical sides of the blocks 100 and 101 until they reach their highest position. Here, the turning of the pole 77 and its blade 86 at its lowest position through 90 degrees swings the arms 97, 97 once more into their flat position; their swinging is checked by the bevelled bottom surface of the upper block 101, whose slant conforms to the greatest angle below the horizontal which the blade 86 assumes. While the blade 86 cuts upward through the air, the anchor arms 97, 97, flat, descend free with the knob 98 bearing against the rollers 99, 99; while the rod 77 is turning around, the knob 98 is bearing against one of the vertical rollers 99a, 99a. If the blade 86 is to turn always in the same direction, the anchor mechanism is arranged with short arms, so that the arms can pass by the bevelled blocks 100 and 101, and with the bevelled blocks on the same side of the stem 77.

The stem 77 is reinforced about the middle of the blade length; it is slightly curved towards its outer extremity. The blades grow thinner as their surface extends farther outward. The surfaces of the blades 86, 86 and a section laid through a blade are outlined in Figures 13 and 14. Either face of the blade has spiked or serrated upright borders and is covered with a network of ridges forming cells with edges of irregular height, resulting in slanting pockets or recesses; the object is, to take full advantage of the viscosity of the air, that is to say, to impede as much as possible and thereby retard the currents formed by the air which, struck by the descending blade, tends to slip away from the middle line of the blade aslant over the blade—outward while the blade is above the horizontal level, and inward while it is below the horizontal—and which tends to rush toward the middle of the upper surface of the descending blade. I accomplish this damming up and impeding of the slanting air currents through a system of short bars or ridges; some of the same lead the air into pockets, and other ridges are athwart the courses of the escaping air; this system of cells is combined with varying depth of the bottom of the cells or partitions formed by the ribs and ridges, causing varying compressing and whirling of the air below the blade. The cells or recesses are larger and deeper as the blade grows thicker. The pattern may be varied many ways without getting away from the principle and object of the device. My preferred material for the blades is hard sulphur-vulcanized india rubber or a similar cured mixture of elastic tenacious hydrocarbon gum reinforced with forged iron rods.

While on the ground or water, the machine rests on the under-carriage or pontoon frame, the two high rear skids or strong arches of light metal tubes (or equivalent pontoons) and, if desirable, on the lateral arch-skids (or pontoons) of the lifting cage; the centre of inertia is a short distance in front of the lifting cage. Before starting to fly, the aerofoils are turned into the vertical or braking position—the front planes on the axle or axles athwart the machine, the rear planes on the axles along the longitudinal axis of the machine, and the weights are shifted so that the centre of inertia of the machine coincides with the resultant of the vertical upward-driving forces, if the machine can climb vertically with its trunk horizontal. If the upward-driving means of the machine have not sufficient power for climbing vertically while the trunk is horizontal and if the aerofoils are permanently fixed, the weights or loads of the machine are shifted rearward so that the centre of inertia of the fuselage lies arrear of the axle 56; the bottom of the lifting cage 58 is ballasted and the cage is unlocked or set free to swing; the ballast is divided so that the lifting structure maintains a horizontal position while the trunk of the machine swings into its vertical position under the impulse of the upward-driving means. The latter, which during vertical ascent or descent with their aid are located concentrically around the temporary centre of inertia of the machine, are now started with a self-starter activated by the engine 3, whose control lever is in the cockpit 5; it is essential that the vertical resultant of the several upward-driving forces, with other words, the centre of lift of the machine, is located in or vertically above or below the centre of inertia of the machine. If the centre of vertical pressure or air resistance does not coincide with the temporary centre of inertia quite exactly, the elevator and other aerofoils of the machine are manipulated so as to correct the divergence and the consequent turning tendency; with fixed front and rear aerofoils this is accomplished by imparting to the upward-driving means of the machine a slanting direction in relation to the longitudinal axis of the machine so that the lifting means drive the machine vertically upward while the trunk of the machine is in a slanting position. If the lifting structure is properly pivoted and ballasted and the temporary centre of inertia of the fuselage 1 lies arrear of the axle 56, the trunk of the machine, while the cage 58 is mounting in a horizontal position, will gradually rear up on the two rear arches 73, 73, After the fuselage of the machine has assumed the vertical position, the forward-driving screw propeller is started (with the self-starter) and with its aid the machine rises from the ground or water upward vertically. When a suitable level safe for maneuvering has been reached, the weights or loads of the fuselage are gradually and cautiously shifted forward; as the centre of inertia passes forward of the axle 56, the fuselage 1 of the machine will assume a slanting and gradually a more and more horizontal position. As the ballast is gradually shifted from the bottom of the lifting cage 58 and the weights or loads and ballast are distributed so as to fix the centre of inertia of the machine at the place where the same is to be located during gliding flight, the trunk 1 of the machine assumes its normal position to the lifting structure 58; the latter is then locked with the fuselage 1 and is turned temporarily into a fixed and rigid part of the machine. If the machine has risen vertically in a horizontal position, with vertical aerofoils, the forward screw propeller is started at a safe level and the fuselage is given a slanting position; the aerofoils are gradually symmetrically and synchronously turned into the normal or horizontal position while the fuselage is kept in a slanting position; the weights are gradually shifted forward while the machine gradually reassumes a horizontal position. For a substantially vertical ascent of the machine in a horizontal position and with vertical aerofoils and for substantially vertical descent or alighting, a vertical crest or centre plane in the rear of the ascending or descending machine and which is in line with the longitudinal axis of the machine is an efficient aid for studying the vertical course. The crest and the centreplane are made folding or collapsible, of some strong fabric such as thin oilcloth, which may be spread, when required, between temporary vertical poles raised or lowered from the fuselage.

When preparing for slow flight with the aid of the upward-driving means, the latter should be started and the centre of inertia should be adjusted before the forward-driving effect is much reduced, unless the machine can rely on its gliding angle during downward flight against the wind. For slow flight I prefer to have the upward-driving means outside of the slipstream of the forward-driving means. During slow horizontal flight with the aid of the upward-driving means braking is resorted to by simultaneous turning of the aerofoil flaps (Figure 7) into their vertical position.

When preparing to alight, the machine approaches the appointed spot facing the wind with downward course. The upward-driving means is started, after ballasting and unlocking the lifting structure, if the same is pivoted, the crest is expanded if the lifting structure is fixed; and the centre of inertia is adjusted. The forward-driving means is shut off gradually and when the machine is above the appointed spot, the front aerofoils, if pivoted, are turned into their vertical position so as to act as brakes; the upward-driving means is gradually reduced so that the machine sinks lightly to the ground or water. If the lifting structure is pivoted and has not power enough for hovering, the fuselage of the machine is given gradually a vertical position, with the aerofoils acting as brakes; when the rear arches or the pontoons touch the ground or water, the upward-driving means is slowed down so that the trunk of the machine sinks gradually forward and comes to rest upon the undercarriage and the lateral skids or arches or pontoons.

I claim:

1. The combination, in a heavier-than-air flying machine, of aerofoils which during gliding flight have a horizontal position and during vertical ascent and descent have a vertical position, and of substantially horizontal bars pivoted on vertical poles below the aerofoils and which are fixed in the body of the machine for confining the aerofoils in their horizontal position so as to prevent the aerofoils from being forced by pressure to turn toward their vertical position.

2. The combination, in a heavier-than-air flying machine, of aerofoils which during gliding flight have a horizontal position and during vertical ascent and descent have a vertical position, and of horizontal frames and bars cooperating above the aerofoils and which are fixed in the body of the machine and by which the aerofoils are prevented from turning farther upward.

3. The combination, in a heavier-than-air flying machine, of aerofoils which during gliding flight have a horizontal position and during vertical ascent and descent have a vertical position; and of substantially horizontal bars pivoted on vertical poles below the aerofoils and which are fixed in the body of the machine for confining the aerofoils in their horizontal position so as to prevent the aerofoils from turning toward their vertical position; and of horizontal bars and frames cooperating above the aerofoils and which are fixed in the body of the machine and by which the aerofoils are prevented from turning farther upward.

4. The combination, in a heavier-than-air flying machine, of forward-driving means and front and rear aerofoils and of upward-driving means between the front aerofoils and the rear aerofoils and means for imparting to the aerofoils a horizontal position for gliding flight and a vertical position for vertical ascent and descent; and of shiftable weights which during the flight can be adjusted either so that the centre of inertia of the machine is located suitably for gliding flight or so that the centre of inertia is located suitably for ascent and descent with the aid of the upward-driving means; and of means for fixing the aerofoils in their horizontal position and for fortifying them in that position so as to prevent the aerofoils from swinging farther upward or to turn toward their vertical position.

5. The combination, in a heavier-than-air flying machine, of means for driving the machine forward along its longitudinal axis and of independent means for driving the machine upward at a right angle to the longitudinal axis, the structures containing the said two driving means being combined so that they can swing through an angle of, say, 90 degrees in relation to each other; and of an arch or arches fixed in the trunk of the machine, the arch or arches embracing a free space around the rear part of the machine so as to support the latter and to protect it from contact with the outside when the longitudinal axis of the machine assumes a vertical upright or a slanting position.

6. In a heavier-than-air flying machine, a mechanism for reciprocating driving blades which embraces the combination of a pole having a cylindrical collar with lengthwise parallel grooves, and of two half-cylinders having like parallel grooves across their surface, the collar of the pole being in mesh with the two half-cylinders, which are on opposite sides of the pole; means for moving the two half-cylinders in opposite directions reciprocatingly, thereby imparting a reciprocating revolving movement to the pole.

7. In a heavier-than-air flying machine, a propelling mechanism which embraces the combination of a pivoted pole carrying a blade and of a pair of eccentric rimmed wheels holding the pole between their rims, and means whereby the wheels are turned synchronously in rhythm so as to keep the pole between their rims, thereby imparting to the pole a reciprocating to and fro movement in the plane of the wheels.

8. In a heavier-than-air flying machine, a propelling mechanism which embraces the combination of a pivoted pole carrying a propelling blade and of means for reciprocating the pole in a certain plane; of means for revolving the pole around its axis at the end of every swing reciprocatingly; and of means for synchronizing and regulating the composite movements of the propelling pole.

9. In a heavier-than-air flying machine, a propelling mechanism which embraces the combination of a pivoted pole carrying a propelling blade and of a pair of eccentric rimmed wheels holding the pole between their rims, and of means whereby the wheels are turned synchronously in rhythm so as to keep the pivoted pole between their rims, thereby imparting to the pivoted pole a reciprocating to and fro movement in the plane of the wheels; and of means whereby the pivoted pole is simultaneously revolved around its axis.

10. In a heavier-than-air flying machine, a combined fluid supply and shiftable weight which embraces the combination of a container of a fluid divided into compartments communicating with one another and provided with an outlet; and of a flexible tube attached to the container outlet, with a nozzle serving as the outlet of the fluid in the container; the distance between the container outlet and the nozzle being adjustable through the automatic coiling of the tube whenever the tube nozzle and the container outlet approach each other, substantially as described.

11. In a heavier-than-air flying machine, the combination of forward-driving means and aerofoils and of upward-driving means, the rear part of the machine extending in the horizontal plane while the machine is flying with the aid of the upward-driving means; the rear part to be extended so as to equalize the pressure of the air upon the front part and upon the rear part of the machine during such flight; and of a collapsible crest along the back of the machine and of an extending centre plane along the lower side of the machine.

12. A blade serving as yielding lever fulcrum for propulsion of a body in a fluid medium, whose surface is provided with ridges crossing one another and forming transversal pockets shaped so as to impede and retard the escape of the fluid medium and to catch and retain a part of the fluid medium when the same is struck and pushed by the blade face and to impede and retard the flow of the fluid medium into the relative vacuum in the rear of the striking blade face, substantially as described.

13. The combination, in a heavier-than-air flying machine, of forward-driving means and major front aerofoils and minor rear aerofoils and of upward-driving means between the front aerofoils and the rear aerofoils, the upward-driving means being independent of the forward-driving means; the rear aerofoils to be expanded horizontally while the machine, substantially horizontal, is ascending or descending more or less vertically so as to adjust the machine to the vertical pressure of the air.

14. The combination, in a heavier-than-air flying machine, of forward-driving means and aerofoils and of upward-driving means; the upward-driving means being independent of the forward-driving means and to be operated simultaneously with the latter, and being contained in a structure that is permanently connected with the trunk of the machine only through a single axle; the lifting structure containing the upward-driving means and the trunk carrying the independent forward-driving means, being constructed so that the trunk can swing freely through an angle of, say, 90 degrees around the axle and in relation to the lifting structure, the forward-driving means being thereby enabled to cooperate with the independent upward-driving means in lifting the machine vertically.

15. The combination, in a heavier-than-air flying machine, of forward-driving means and aerofoils and of upward-driving means; the upward-driving means being independent of the forward-driving means and to be operated simultaneously with the latter, and being contained in a structure that is permanently connected with the trunk of the machine only through a single axle, the structure containing the upward-driving means and the trunk carrying the independent forward-driving means being constructed so that the trunk can swing freely through an angle of, say, 90 degrees around the axle and in relation to the lifting structure, the forward-driving means being thereby enabled to cooperate with the independent upward-driving means in lifting the machine vertically; and of means whereby the centre of inertia of the trunk is fixed either so that it is located suitable for flight with the trunk horizontal, or so that it is located suitable for flight with the trunk vertical; and of a mechanism causing the trunk to swing around the axle.

16. In a heavier-than-air flying machine, the combination of the trunk and of another structure outside of the trunk and connected with the same only through a horizontal transversal axle, around which the trunk can swing through an angle of, say, 90 degrees; and of a mechanism causing such swinging of the trunk around the axle by shifting the centre of inertia of the trunk in relation to the axle.

FELIX F. von WILMOWSKY.